United States Patent
Bang (10) Patent No.: US 9,315,232 B2
(45) Date of Patent: Apr. 19, 2016

(54) TRANSMISSION

(75) Inventor: Young Bong Bang, Seoul (KR)

(73) Assignee: ADVANCED INSTITUTES OF CONVERGENCE TECHNOLOGY, Gyeonggi-Do (KR)

( * ) Notice: Subject to any disclaimer, the term of this patent is extended or adjusted under 35 U.S.C. 154(b) by 0 days.

(21) Appl. No.: 14/387,842

(22) PCT Filed: Mar. 30, 2012

(86) PCT No.: PCT/KR2012/002372
§ 371 (c)(1),
(2), (4) Date: Sep. 25, 2014

(87) PCT Pub. No.: WO2013/147347
PCT Pub. Date: Oct. 3, 2013

(65) Prior Publication Data
US 2015/0080163 A1 Mar. 19, 2015

(30) Foreign Application Priority Data
Mar. 30, 2012 (KR) .................. 10-2012-0032816

(51) Int. Cl.
| | | |
|---|---|---|
| B62M 11/14 | (2006.01) | |
| F16H 3/72 | (2006.01) | |
| B62M 6/60 | (2010.01) | |
| F16H 3/44 | (2006.01) | |
| B62M 23/02 | (2010.01) | |
| B62M 7/12 | (2006.01) | |

(52) U.S. Cl.
CPC .......... *B62M 11/14* (2013.01); *B62M 6/60* (2013.01); *B62M 7/12* (2013.01); *B62M 23/02* (2013.01); *F16H 3/44* (2013.01); *F16H 3/72* (2013.01); *B62K 2202/00* (2013.01); *B62K 2204/00* (2013.01); *F16H 3/724* (2013.01); *F16H 2200/2084* (2013.01)

(58) Field of Classification Search
CPC .............................................. F16H 2200/2084
See application file for complete search history.

(56) References Cited

U.S. PATENT DOCUMENTS 6,012,538 A * 1/2000 Sonobe .................... B62M 6/45
180/206.3
8,500,590 B2 * 8/2013 Showalter ............... F02N 11/04
475/154

(Continued)

FOREIGN PATENT DOCUMENTS

| JP | 05-319110 A | 12/1993 |
| JP | 08-207878 A | 8/1996 |
| JP | 2005-088746 A | 4/2005 |

(Continued)

*Primary Examiner* — Mark Manley
(74) *Attorney, Agent, or Firm* — Revolution IP, PLLC (57) ABSTRACT

Disclosed is a transmission comprising: a first driving source configured to provide a rotational force and having a first input shaft; a second driving source configured to provide the rotational force and having a second input shaft; a planetary gear unit including a sun gear, a planetary gear and a ring gear, two of the sun gear, the planetary gear and the ring gear being connected to each of the first input shaft and the second input shaft, and the remaining one being connected to an output shaft; a first one-way clutch disposed between the first driving source and the planetary gear unit; and a second one-way clutch disposed between the second driving source and the planetary gear unit, wherein the first direction and the second direction are set such that the output shaft of the planetary gear unit is rotated in the same direction.

20 Claims, 8 Drawing Sheets

(56) References Cited

U.S. PATENT DOCUMENTS

2006/0019786 A1 * 1/2006 Asa .................... F01C 17/02
475/5
2014/0255210 A1 * 9/2014 Hwang .................. F04C 14/08
417/16

FOREIGN PATENT DOCUMENTS

| KR | 20-0239868 Y1 | 10/2001 |
| KR | 10-2010-0112974 A | 10/2010 |

* cited by examiner

TRANSMISSION

CROSS REFERENCE TO PRIOR APPLICATIONS

This application is a National Stage Application of PCT International Patent Application No. PCT/KR2012/002372 filed on Mar. 30, 2012, under 35 U.S.C. §371, which claims priority to Korean Patent Application No. 10-2012-0032816 filed on Mar. 30, 2012, which are all hereby incorporated by reference in their entirety.

TECHNICAL FIELD

The present invention relates to a transmission, and more particularly, to a transmission which performs a change of speed of inputs from two motors in a multi-step manner.

BACKGROUND ART

Generally, a transmission capable of being used in a two-wheeled vehicle such as an electric power assisted bicycle and an electric scooter, or a multi-wheeled vehicle, and performing a change of speed using two motors has been known.

In such a transmission, a planetary gear unit is disposed. When a rotational torque is applied to one of two input shafts (a sun gear and a ring gear) according to an operation of one of the two motors, a torque which rotates an input shaft of the other motor in a reverse direction is generated. At this time, in order for the input shaft of the other motor not to be rotated, a current applied to the other motor so as to generate a stop torque, or an electromagnetic brake system which fixes or releases a gear connected to the other motor is installed to forcibly fix the gear.

However, when the current is applied to the other motor so as to generate the stop torque, power consumption occurs, and the other motor generates heat while the stop torque is generated. Further, when the electromagnetic brake system is installed, there are some problems that an entire volume of the transmission is increased, and a time delay caused by a mechanical operation occurs. Furthermore, there is another problem that the electromagnetic brake system consumes a predetermined amount of electric power.

DISCLOSURE

Technical Problem

The present invention is directed to providing a transmission which uses a one-way clutch configured to prevent one of input shafts of two driving sources from being rotated in a reverse direction and to mechanically allow the one of the input shafts to be rotated in only one direction, thereby preventing unnecessary power consumption, and minimizing an increase in an entire size thereof and time delay caused by a mechanical operation.

Technical Solution

One aspect of the present invention provides a transmission including a first driving source configured to provide a rotational force and having a first input shaft; a second driving source configured to provide the rotational force and having a first input shaft; a planetary gear unit including a sun gear, a planetary gear and a ring gear, two of the sun gear, the planetary gear and the ring gear being connected to each of the first input shaft and the second input shaft, and the remaining one being connected to an output shaft; a first one-way clutch disposed between the first driving source and the planetary gear unit to allow the first input shaft to be rotated in only a first direction while mechanically restraining rotation thereof in an opposite direction to the first direction; and a second one-way clutch disposed between the second driving source and the planetary gear unit so as to allow the second input shaft to be rotated in only a second direction while mechanically restraining rot thereof in an opposite direction to the second direction, wherein the first direction and the second direction are set such that the output shaft of the planetary gear unit is rotated in the same direction.

The first one-way clutch may include a first rotational body connected with the first input shaft, and a second rotational body, and the first rotational body may be formed to be relatively rotated with respect to the second rotational body in the first direction.

The first one-way clutch may be one of a sprag clutch, a roller clutch and a ratchet clutch.

The second rotational body may be restrained from being rotated.

The second rotational body may be selectively rotated or restrained from being rotated by a first brake.

The second input shaft may be selectively rotated or restrained from being rotated by a second brake.

The second one-way clutch may include a third rotational body connected with the second input shaft, and a fourth rotational body, and the third rotational body may be formed to be relatively rotated with respect to the fourth rotational body in the second direction.

The second one-way clutch may be one of a sprag clutch, a roller clutch and a ratchet clutch.

The fourth rotational body may be restrained from being rotated.

The fourth rotational body may be selectively rotated or restrained from being rotated by a first brake.

The first driving source may be connected with the sun gear, and the second driving source may be connected with the ring gear.

An output-side clutch configured to selectively connect and disconnect a rotational force from the first or second driving source may be connected to the output shaft.

The output-side clutch may be an electromagnetic clutch operated by an electric signal.

The transmission may be installed on one of an electric bicycle, a scooter and a vehicle.

Advantageous Effects

According to the transmission of the present invention, each one-way clutch is disposed between the driving sources and the planetary gear unit to mechanically prevent one input shaft from being rotated in the reverse direction when the rotational torque is applied to the other input shaft, and thus it is possible to minimize the size of the transmission, to provide excellent durability and to eliminate power consumption.

MODES OF THE INVENTION

Hereinafter, a transmission according to one embodiment of the present invention will be described in detail with reference to the accompanying drawings.

In the embodiment, a "first direction" may be a clockwise or counterclockwise direction, and a "second direction" may also be a clockwise or counterclockwise direction. Further, the first direction and second direction may be the same direction as each other, or may be different from each other. Therefore, the description of the first direction and the second direction in the embodiment of the present invention is only an example, and alternatively, the combination of various directions may be set. However, the first direction and the second direction should satisfy a condition that an output shaft can be rotated in the same direction. Under such a condition, the combination of any directions can be allowed according to design conditions.

The present invention relates to an in-wheel type transmission in which the transmission is built in a wheel, and more particularly, to a transmission which easily performs a speed change to a low speed, a high speed and an ultrahigh speed (speeding), has excellent durability, and minimizes an entire size and unnecessary power consumption thereof.

Figure 1:
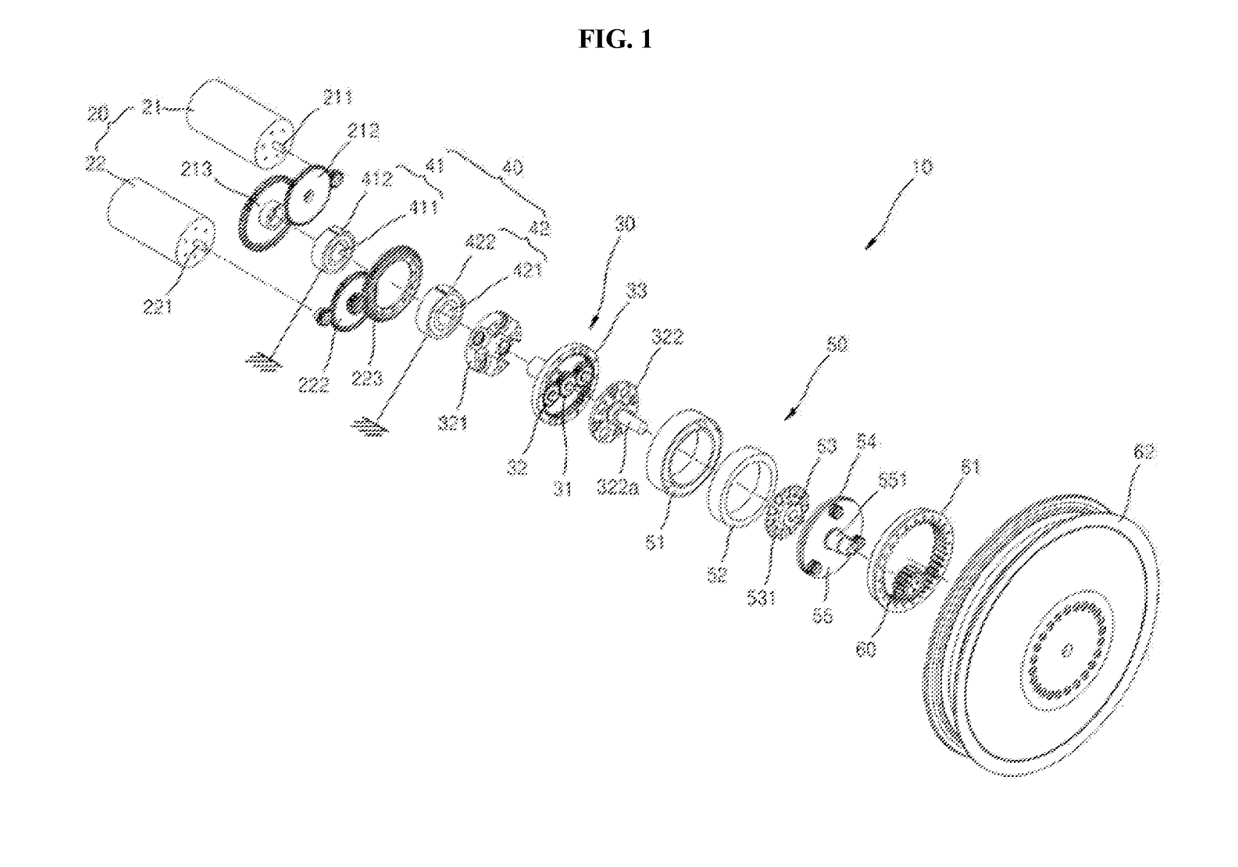
FIG. 1 is an exploded perspective view of a transmission according to one embodiment of the present invention.

The transmission 10 includes a driving source 20, a planetary gear unit 30, a one-way clutch 40 and an output-side clutch 50.

The driving source 20 provides a rotational force, has an input shaft and includes a first driving source 21 and a second driving source 22.

The first driving source 21 has a rotatable first input shaft 211. A motor, an engine or the like may be used as the first driving source, and another device may also be used, as long as it is possible to rotate the first input shaft 211. When the motor is used as the first driving source 21, the first driving source may be rotated in forward and reverse directions, and may also be driven by electric power. However, in the case of the engine, the first driving source may be rotated in only one direction, and may be operated with gasoline, diesel or the like. The first input shaft 211 of the first driving source 21 is engaged and connected with a first spur gear 212, and the first spur gear 212 is engaged and connected with a second spur gear 213.

The second spur gear 213 may be connected with a sun gear 31 via a first one-way clutch 41. Therefore, the first input shaft 211 of the first driving source 21 is connected with the first one-way clutch 41 through the first and second spur gears 212 and 213.

The second driving source 22 has a second input shaft 221. Like the first driving source 21, a motor, an engine or the like may be used as the second driving source 22. At this time, both the first driving source 21 and the second driving source 22 may be motors or engines, and otherwise, one of them may be an engine, and the other may be a motor. The first driving source 21 and the second driving source 22 may be fixed and installed in a housing to be adjacent to each other. Meanwhile, the second input shaft 221 of the second driving source is engaged with a third spur gear 222, and the third spur gear 222 is engaged with a fourth spur gear 223. The fourth spur gear 223 may be connected with a ring gear 33 via a second one-way clutch 42 to be described later. Therefore, the input shaft of the second driving source 22 is connected with the second one-way clutch 42 via the third and fourth spur gears 222 and 223.

The planetary gear unit 30 includes the sun gear 31, a planetary gear 32 and the ring gear 33. Two of the sun gear 31, the planetary gear 32 and the ring gear 33 are connected with each of the first and second input shafts 211 and 221, and the other one is connected with an output shaft 322a to provide a rotational force to a wheel 62.

The sun gear 31 is disposed at a center of the ring gear 33 to be engaged with the planetary gears 32 between the planetary gears 32. The sun gear 31 is connected with the second spur gear 213 via the first one-way clutch 41.

The planetary gear 32 is disposed in the ring gear 33 to surround the sun gear 31, and coupled between a cage body 321 and a cage output side 322 to be supported by a shaft. The sun gear 31 is connected to the second spur gear 213 via the first one-way clutch 41. Specifically, the planetary gear 32 revolves around the sun gear 31, and rotates the output shaft 322a.

The ring gear 33 is configured so that the planetary gear 32 and the sun gear 31 are disposed therein. The ring gear 33 is connected to the spur gear 223 via the second one-way clutch 42.

The first one-way clutch 41 is disposed between the first driving source 21 and the planetary gear unit 30 to allow the first input shaft 211 to be rotated in only a first direction while mechanically restraining the rotation thereof in an opposite direction to the first direction. A sprag clutch may be used as the first one-way clutch 41, which specifically includes a first rotational body (an inner ring) 411 connected with the first input shaft 211, a second rotational body (an outer ring) 412 disposed to be spaced a predetermined distance from the first rotational body 411 and thus having a space therebetween, and sprags (not shown). At this time, the sprags are disposed between the inner ring and the outer ring to idle when the first rotational body 411 is rotated in the first direction, such that the first rotational body 411 is relatively rotatable with respect to the second rotational body 412, and also to be held between the inner ring and the outer ring when the first rotational body 411 is rotated in the opposite direction to the first direction, such that the first rotational body 411 is restrained from being relatively rotated with respect to the second rotational body 412.

At this time, since the second rotational body 412 is fixed to the housing (not shown), when the first rotational body 411 is rotated in the first direction, the first rotational body 411 is relatively rotatable with respect to the second rotational body 412, and thus allows the rotation of the first input shaft 211, and when the first rotational body 411 is rotated in the opposite direction to the first direction, the first rotational body 411 is restrained from being relatively rotated with respect to the second rotational body 412, and thus the rotation of the first input shaft 211 is restrained.

The second one-way clutch 42 is disposed between the second driving source 22 and the planetary gear unit 30 to allow the second input shaft 221 to be rotated in only the second direction while mechanically restraining the rotation thereof in the opposite direction to the second direction. A sprag clutch may be used as the second one-way clutch 42, which specifically includes a third rotational body (an inner ring) 421 connected with the second input shaft 221, a fourth rotational body (an outer ring) 422 disposed to be spaced a predetermined distance from the third rotational body 421 and thus having a space therebetween, and sprags (not shown). At this time, the sprags are disposed between the inner ring and the outer ring to idle when the third rotational body 421 is rotated in the second direction, such that the third rotational body 421 is relatively rotatable with respect to the fourth rotational body 422, and also to be held between the inner ring and the outer ring when the third rotational body 421 is rotated in the opposite direction to the second direction, such that the third rotational body 421 is restrained from being relatively rotated with respect to the fourth rotational body 422.

At this time, since the fourth rotational body 422 is fixed to the housing (not shown), when the third rotational body 421 is rotated in the second direction, the third rotational body 421 is relatively rotatable with respect to the fourth rotational body 422, and thus allows the rotation of the second input shaft 221, and when the third rotational body 421 is rotated in the opposite direction to the second direction, the third rotational body 421 is restrained from being relatively rotated with respect to the fourth rotational body 422, and thus the rotation of the second input shaft 221 is restrained.

Meanwhile, the first direction and the second direction are set to be rotatable in the same direction as a rotational direction of the output shaft 322a of the planetary gear unit 30, for example, the cage body 321 of the planetary gear unit 30 in the embodiment. Therefore, the first direction and the second direction may be a clockwise or counterclockwise direction, and may be the same direction as each other, or may be different from each other according to design conditions.

The output-side clutch 50 serves to selectively transmit a rotational force from the first driving source 21 or the second driving source 22 to a body to be rotated, e.g., the wheel 62. In the embodiment, an electromagnetic clutch is used as the output-side clutch 50. The electromagnetic clutch includes an electromagnetic yoke 51, an electromagnetic coil 52, an input disc 53, a moving disc 54 and an output disc 55.

The electromagnetic yoke 51 in which the electromagnetic coil 52 is installed is configured to cover the electromagnetic coil.

The electromagnetic coil 52 serves to form a magnetic field according to an electric signal, is formed in a ring shape, and is disposed in the electromagnetic yoke 51.

The input disc 53 is connected with the cage output side 322 to receive a rotational force of the cage output side 322, and form in an approximately circular plate shape having a plurality of recesses 531 formed on a surface thereof.

The moving disc 54 is moved toward or away from the input disc 53 according to whether the magnetic field of the electromagnetic coil 52 is generated, and has a plurality of protrusions (not shown) formed on a surface thereof to be mated with the recesses 531 formed on the surface of the input disc 53.

The output disc 55 is rotated with the moving disc, and has a shaft part 551. When the input disc 53 is rotated in a state in which the moving disc 54 is attached to the input disc 53, the output disc 55 is rotated together to transmit a rotational force thereof to the wheel 62.

Meanwhile, reference numerals 60, 61 and 62 are a pinion gear, an output-side ring gear and the wheel, respectively. The pinion gear 60 receives the rotational force from the output disc 55, and rotates the output-side ring gear 61. The output-side ring gear 61 is connected to the wheel 62 to rotate the wheel 62 according to a rotation of the pinion gear 60.

The transmission according to one embodiment of the present invention has the following operational effects.

Figure 2:
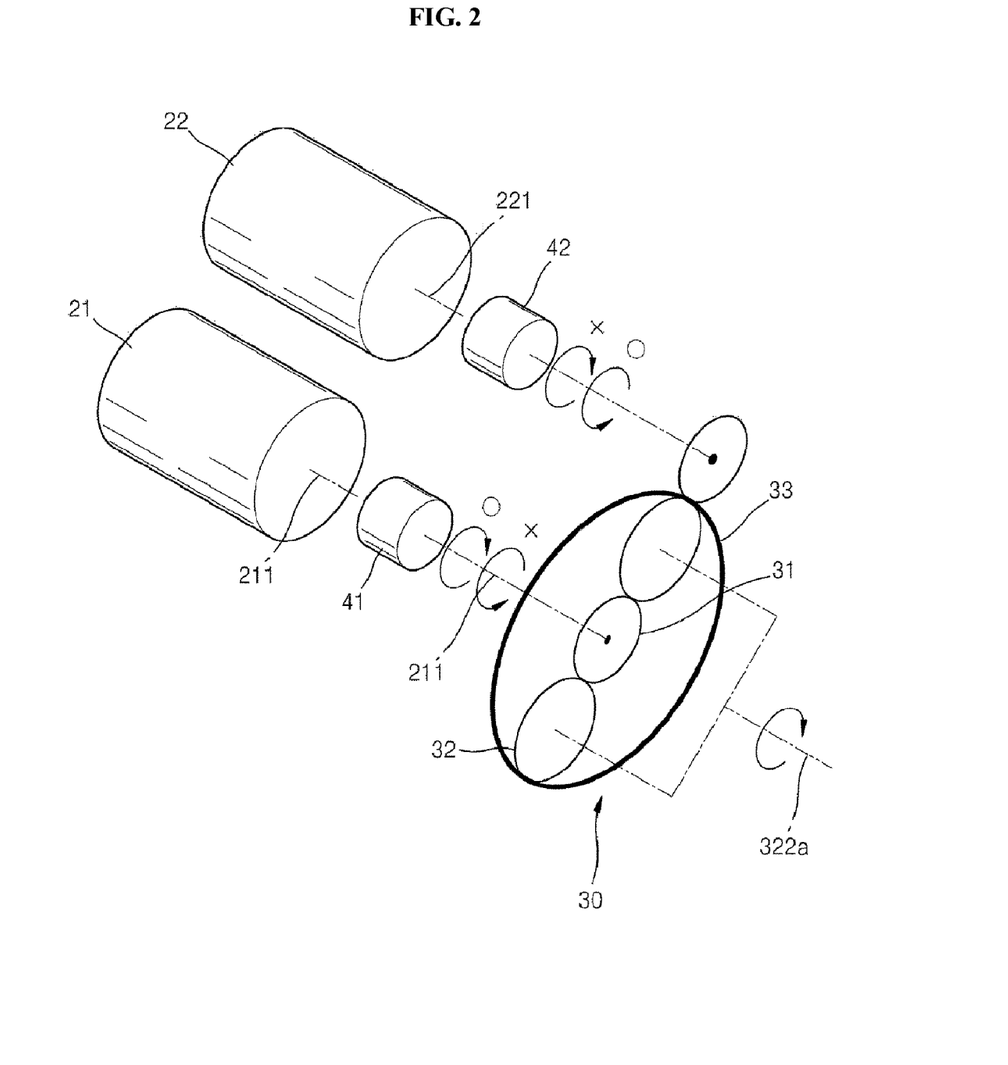
FIG. 2 is a conceptual view of the transmission according to one embodiment of the present invention.

Firstly, an operating state of the present invention will be described with reference to FIG. 2. When the first driving source 21 is rotated in the clockwise direction, the sun gear 31 connected with the first driving source 21 is rotated in the clockwise direction (the first direction). At this time, the planetary gear 32 is rotated in the counterclockwise direction, and when a load is applied to the output shaft 322a, a rotational force in the counterclockwise direction is applied to the ring gear 33. A rotational torque that applies a rotational force in the counterclockwise direction is transmitted to the second one-way clutch 42 in a state in which a rotational direction thereof is changed to the clockwise direction through a gear circumscribed with the ring gear 33. At this time, since the second one-way clutch 42 allows the rotational direction to be only the counterclockwise direction (the second direction), the second input shaft 221 is restrained from being rotated in the clockwise direction (the opposite direction of the second direction). Therefore, the ring gear 33 is restrained and fixed, and thus only the sun gear 31 and planetary gear 32 are rotated. The cage body is also rotated together with the rotation of the planetary gear 32, and thus the output shaft 322a may be rotated in the clockwise direction.

Meanwhile, when the second driving source 22 is rotated in the counterclockwise direction (the second direction), the ring gear 33 is rotated in the clockwise direction, and thus the planetary gear 32 is rotated in the clockwise direction. When a load is applied to the output shaft 322a, the rotational torque of the planetary gear 32 applies a rotational force to the sun gear 31 in the counterclockwise direction. At this time, since the first one-way clutch 41 restrains the rotational force in the counterclockwise direction (the opposite direction to the first direction), only the planetary gear 32 and ring gear 33 are rotated, while the sun gear 31 is fixed. Therefore, while only the ring gear 33 is rotated, the rotational force of the planetary gear 32 rotates the cage body in the clockwise direction.

Meanwhile, the rotation caused by the first driving source 21 is further decelerated than that caused by the second driving source 22. Therefore, the rotation caused by the first driving source 21 is performed at a low speed, the rotation caused by the second driving source 22 is performed at a high speed, and the rotation caused by both the first and second driving sources 21 and 22 is performed at a maximum speed.

More specifically, when the sun gear is rotated and the ring gear is fixed, a deceleration ratio is $(Ds+Dr)/Ds$, and when the ring gear is rotated and the sun gear is fixed, the deceleration ratio is $(Ds+Dr)/Dr$ (wherein Ds is a diameter of a pitch circle of the sun gear, and Dr is a diameter of a pitch circle of the ring gear).

At this time, when $Ds<Dr$, $(Ds+Dr)/Ds>(Ds+Dr)/Dr$, and thus the deceleration ratio in the rotation caused by the second driving source 22 is smaller, and an output side thereof is rotated at a high speed.

Further, when the first and second driving sources are rotated at the same time, the output side has a rotational speed to which each rotational speed is added when each motor is operated, and thus is rotated at a maximum speed.

Based on such a basic operating concept, the operating state of the embodiment will be described with reference to FIGS. 3 to 5.

Figure 3:
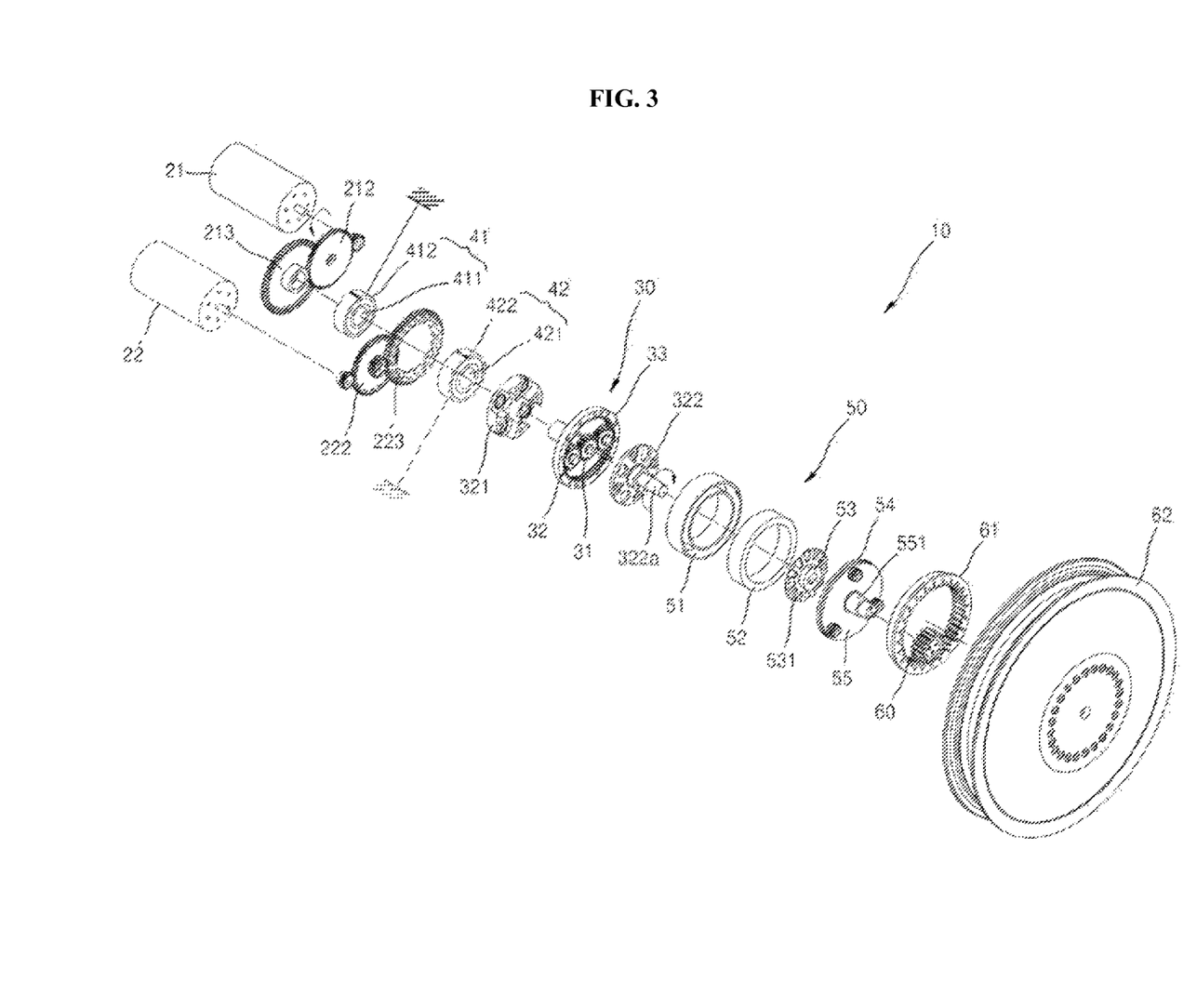
FIGS. 3 to 5 are views illustrating operations of the transmission of FIG. 1.

FIG. 3 illustrates a state in which the wheel 62 is rotated at a low speed by the first driving source 21. When the first driving source 21 is rotated, the rotational force of the first input shaft 211 is transmitted to the first one-way clutch 41 via the first and second spur gears 212 and 213. At this time, the rotational force of the first one-way clutch 41 is transmitted to the sun gear 31, and the rotational force of the sun gear is transmitted to the planetary gear 32 and the ring gear 33. At this time, since the ring gear is restrained from being rotated, only the planetary gear 32 and sun gear 31 are rotated, while the ring gear 33 is fixed. Like this, when the planetary gear 32 is rotated by the sun gear 31, the cage body and the cage output side 322 are rotated, and the rotational force thereof is transmitted to the wheel 62 via the electromagnetic clutch. However, in order for the wheel 62 to be rotated together with the cage output side 322, the electric signal should be applied to the electromagnetic clutch. If the electric signal is not applied to the electromagnetic clutch, the moving disc 54 is spaced from the input disc 53, and thus the rotational force of the cage output side 322 is not transmitted to the wheel 62.

A case in which the electric signal is not applied to the electromagnetic clutch typically means that a person intends to rotate the wheel 62 of an electric bicycle by himself/herself, or pulls a scooter by hand. For example, when the person intends to rotate the wheel 62 by hand, the moving disc 54 is not mated with the input disc 53 not to be rotated together, and thus the wheel 62 may be freely rotated.

Figure 4:
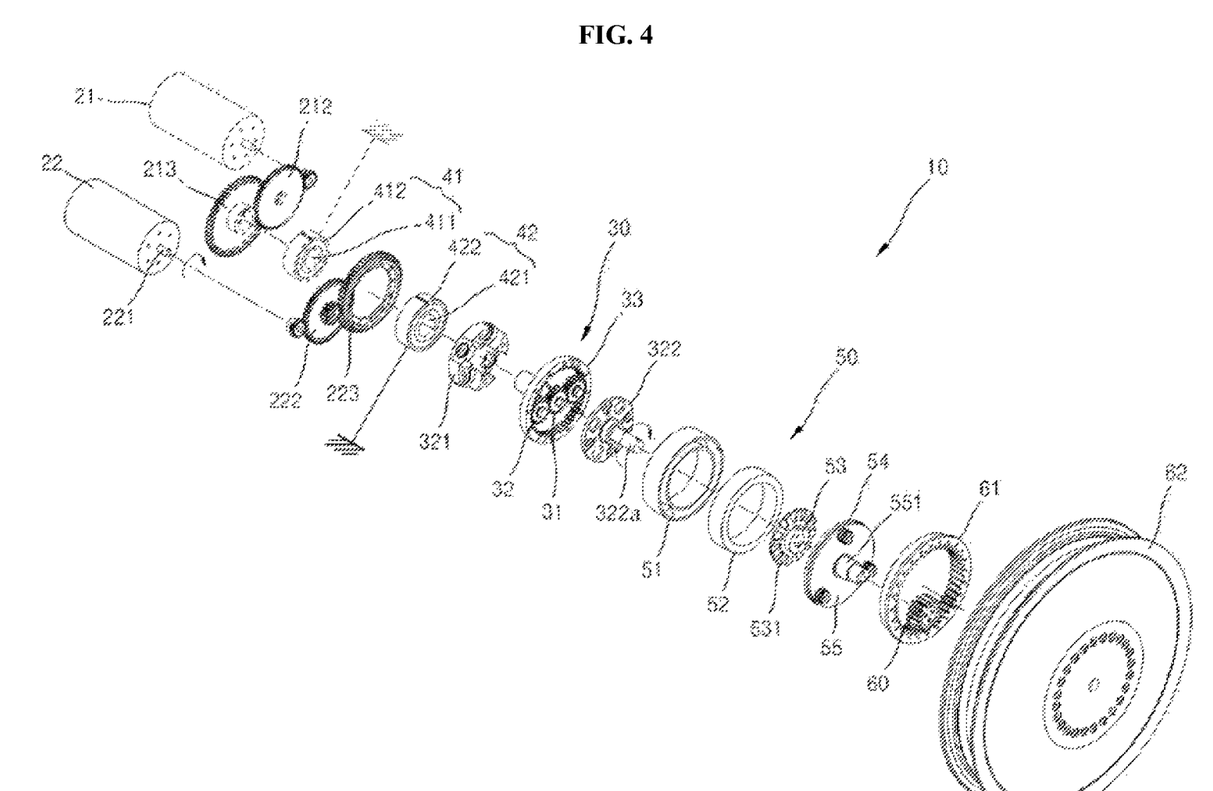

Meanwhile, FIG. 4 illustrates a state in which the wheel 62 is rotated at a high speed by the second driving source 22. When the second driving source 22 is rotated, the rotational force of the second input shaft 221 is transmitted to the second one-way clutch 42 via the third and fourth spur gears 222 and 223. At this time, the rotational force of the second one-way clutch 42 is transmitted to the ring gear 33, and the rotational force of the ring gear 33 is transmitted to the planetary gear 32 and the sun gear 31. At this time, since the sun gear 31 is restrained from being rotated by the first one-way clutch 41, only the planetary gear 32 and the ring gear 33 are rotated while the sun gear 31 is fixed. Like this, when the planetary gear 32 is rotated by the ring gear 33, the cage body 321 and the cage output side 322 are rotated, and the rotational force thereof is transmitted to the wheel 62 via the electromagnetic clutch, and thus the wheel 62 is rotated at the high speed.

Figure 5:
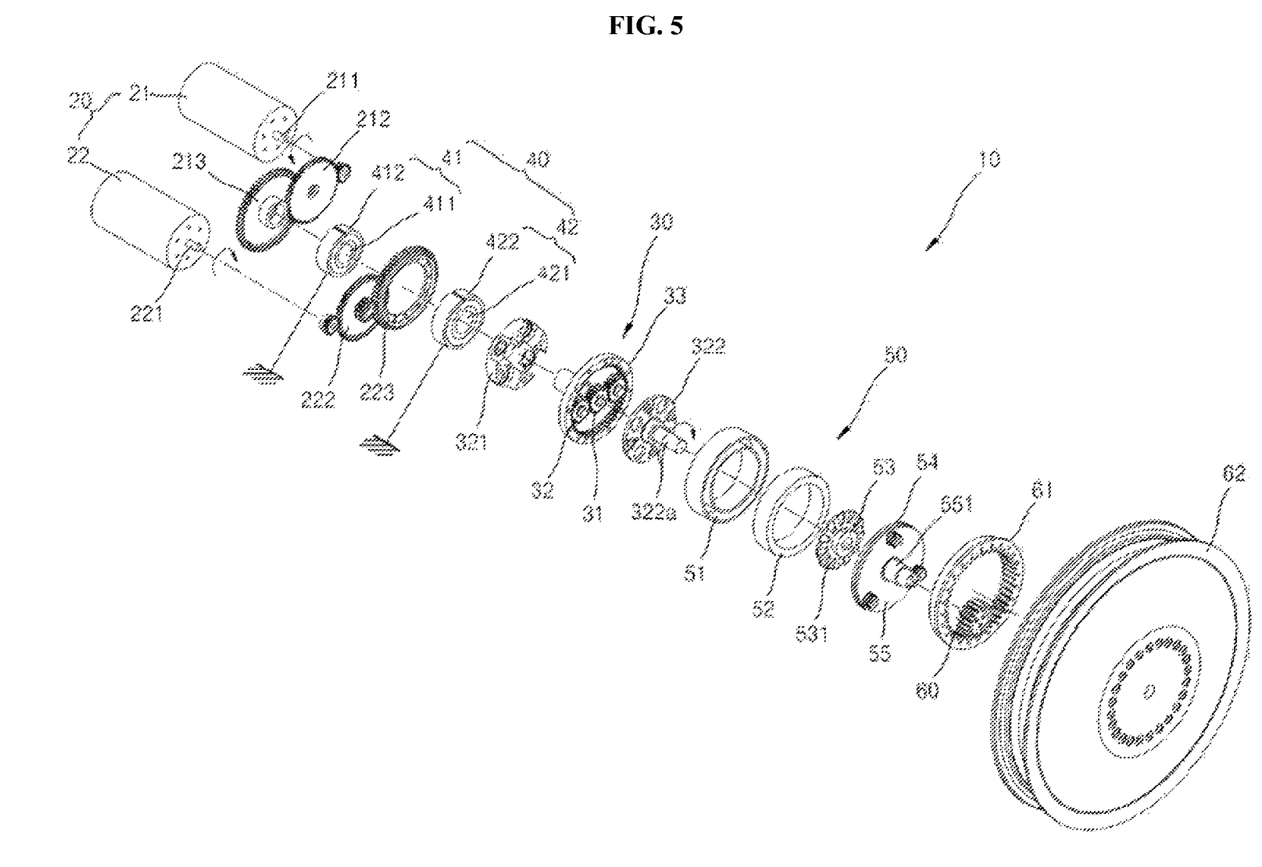

FIG. 5 illustrates a state in which the first and second driving sources 21 and 22 are rotated at the same time, and thus the wheel 62 is rotated at the maximum speed in which two rotational speeds are added. When the first input shaft 211 of the first driving source 21 is rotated, the sun gear 31 is rotated, and when the second input shaft 221 of the second driving source 22 is rotated, the ring gear 33 is rotated. Like this, when the two driving sources are rotated at the same time, the planetary gear 32 disposed between the ring gear 33 and the sun gear 31 rotates the cage body 321 at a speed that is the sum of the rotational speeds through the configuration illustrated in FIGS. 3 and 4. When the planetary gear 32 is rapidly rotated by the rotation of the ring gear 33 and the sun gear 31, the rotational force thereof is transmitted to the wheel 62 via the cage output side 322 and the output-side clutch 50.

Figure 6:
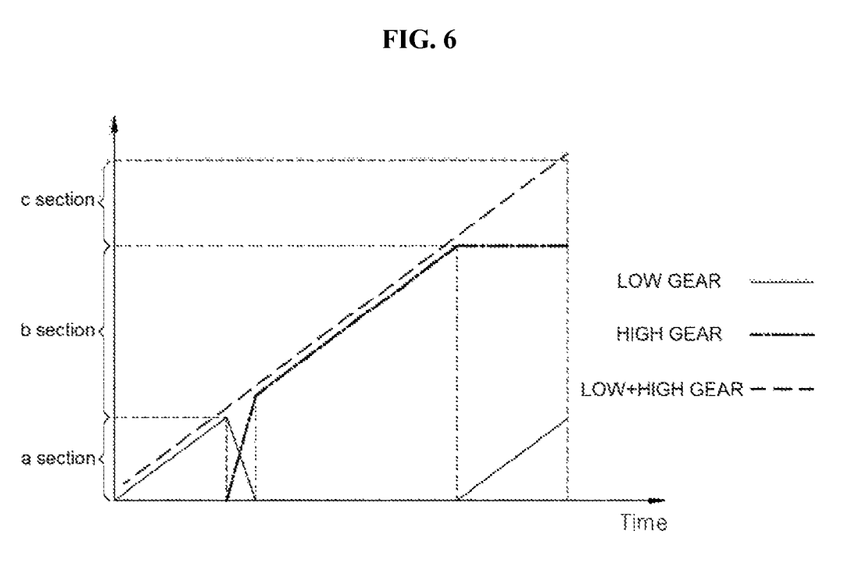
FIG. 6 is a view illustrating a speed control method of the transmission of FIG. 1.

According to the transmission according to the embodiment, since each output of a low gear and a high gear is added without cutting off power, and a final output is generated, a general speed controlling method is also simple. FIG. 6 illustrates an output controlling method of the low gear and the high gear, which allows the final output speed to be smoothly and continuously increased, considering the deceleration ratio of the low gear and the deceleration ratio of the high gear.

Using the fact that there is a difference between the deceleration ratio of the low gear and the deceleration ratio of the high gear, the low gear is basically used in a low speed section (a section), and the high gear is basically used in a high speed section (b section). Since the final output corresponds to a sum of an output of the low gear and an output of the high gear due to design characteristics, a speeding (ultrahigh speed) section (c section) which may obtain higher speeds than those of the high speed section is generated.

When performing the speed control, the speed may be smoothly changed without a shock of changing the speed by controlling the timing and acceleration/deceleration ratio of the deceleration of the low gear in the high speed section and an acceleration section of the high gear.

In the transmission according to one embodiment of the present invention, since the one-way clutch is installed to prevent the rotation of one driving source when the other driving source is rotated, there are some advantages that an entire structure thereof is simple, and the power consumption is eliminated.

However, the conventional technique uses the electromagnetic brake or supplies the power to the driving source to prevent the reverse rotation of the driving source. In this case, the power consumption is increased or the entire volume thereof is increased.

The transmission according to one embodiment of the present invention may be changed as follows.

Firstly, in the embodiment described above, the wheel is configured to be rotated in only one direction (e.g., forward movement), and not in the other direction (e.g., backward movement). That is, since the output of each driving source is restrained by a one-way clutch so that the wheel is rotated in only one direction, the wheel may be rotated in only one direction, even when the outputs of the two driving sources are added. In the case of the scooter or the electric bicycle, the driving force may be generated in only one direction of the wheel, and a decelerator may be used as it is as the above-mentioned device. However, in order to use the transmission of the present invention in a vehicle, the backward movement should also be allowed. This case will be described in FIG. 7. Specifically, in a transmission 10' according to another embodiment of the present invention, a one-way clutch 40' may not be fixed to the housing (not shown), but may be installed to be engaged with a first brake B1 by which the rotation thereof may be restrained and released.

Figure 7:
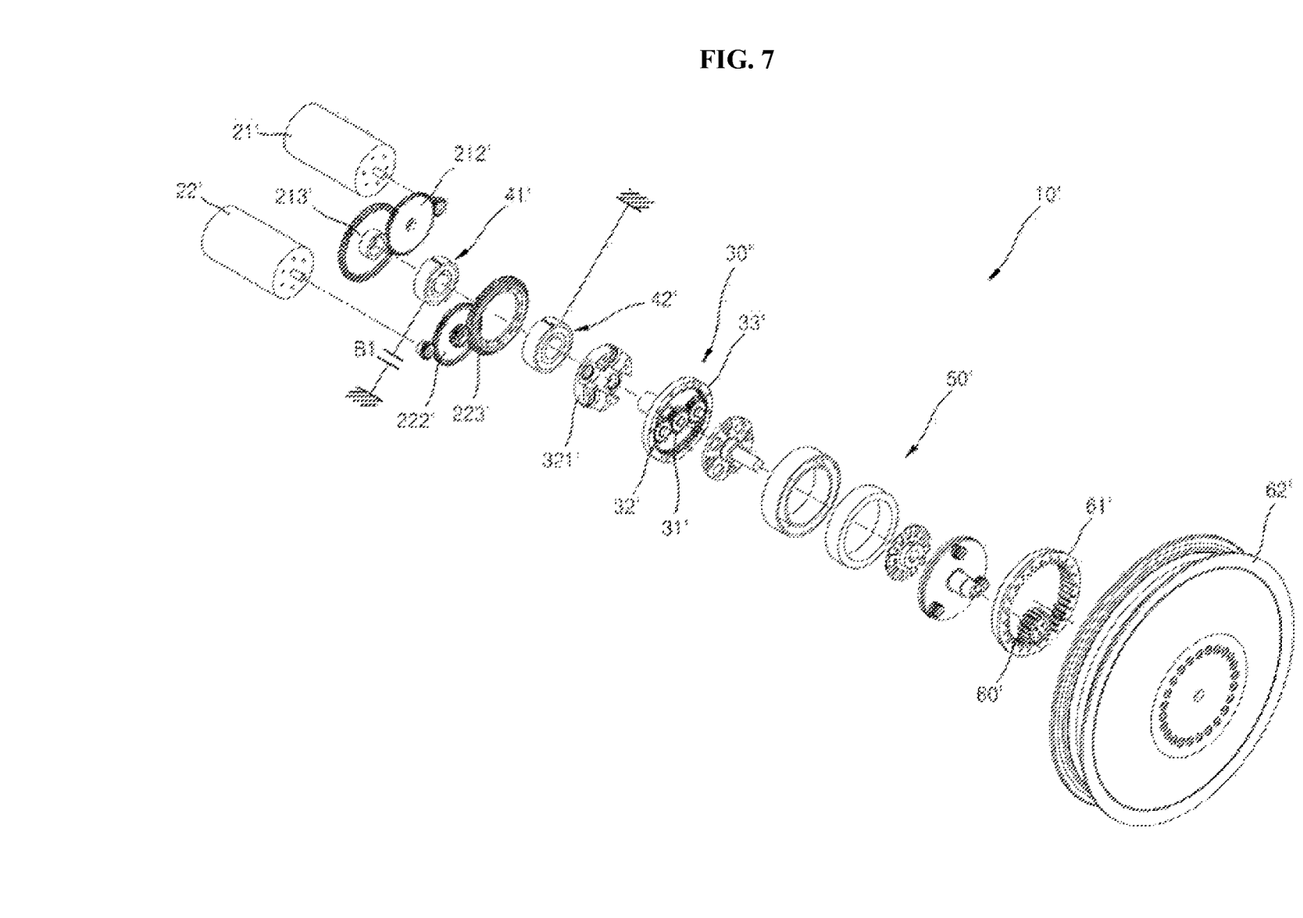
FIG. 7 is an exploded perspective view illustrating a transmission according to another embodiment of the present invention.

For example, one of a first one-way clutch 41' and a second one-way clutch 42' may be engaged with the first brake. Preferably, the first brake B1 is installed at the first one-way clutch 41' disposed at the low gear having a low speed and a high torque when considering the backward movement. In the case in which the first brake B1 is installed as described above, when a rotational force is applied to the wheel 62' in the opposite direction by rotating a driving source 20', the first brake B1 is released so that the first one-way clutch 41' or the second one-way clutch 42' is allowed to be rotated in a restrained direction (the opposite direction to the first direction or the opposite direction to the second direction). For example, in order for the one-way clutch of which the rotation is restrained in the clockwise direction to be allowed to be rotated in the counterclockwise direction, the brake is released so that the one-way clutch may be freely rotated, and then the driving source (e.g., a motor) is rotated in the opposite direction (to the rotational direction when moving forward), and thus the wheel may be rotated in the opposite direction (the backward direction). Various brakes such as a friction brake, a gear type brake and an electronic brake may be used as the first brake.

Figure 8:
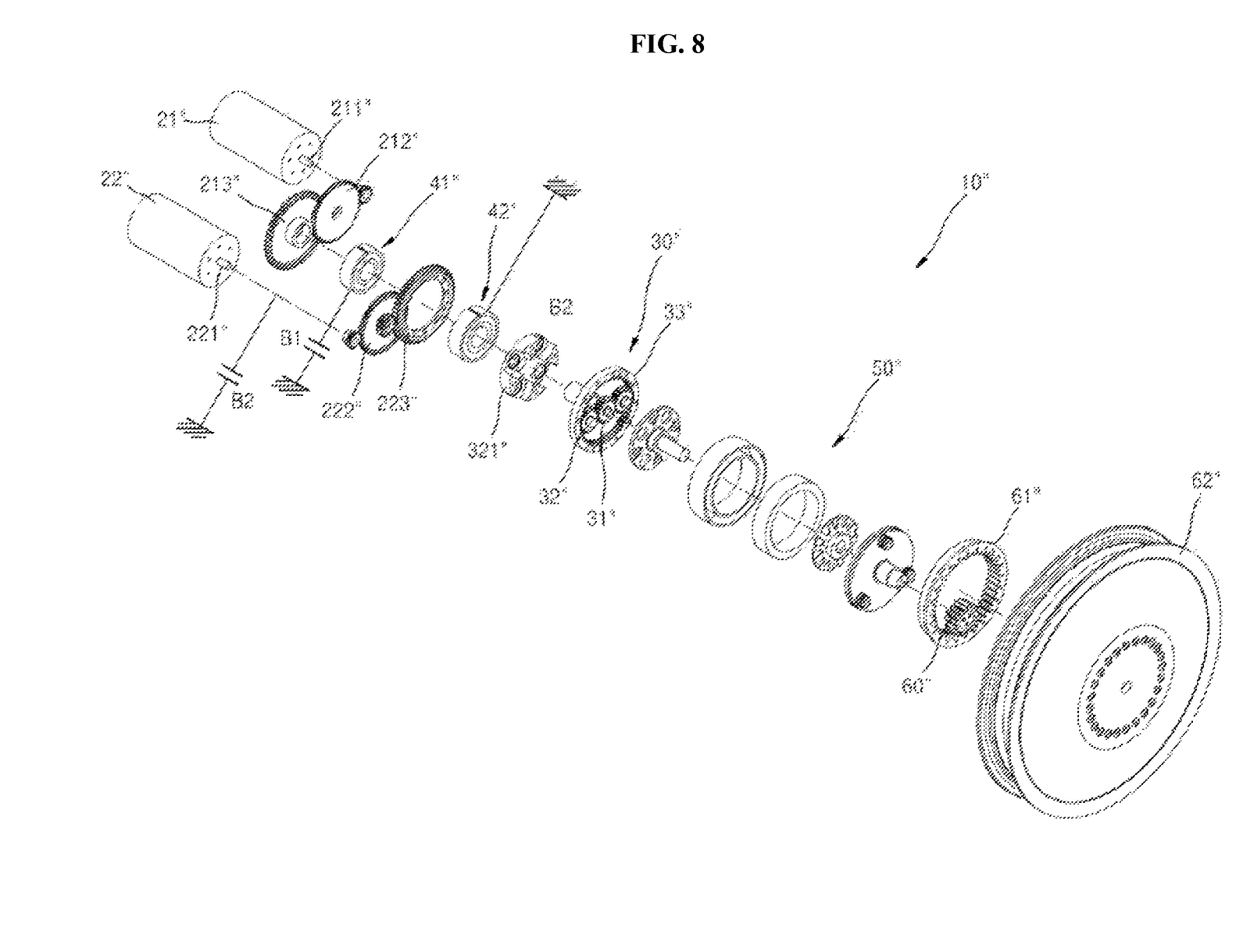
FIG. 8 is an exploded perspective view illustrating a transmission according to still another embodiment of the present invention.

Further, a transmission 10" according to still another embodiment of the present invention as illustrated in FIG. 8 additionally includes a second brake B2 disposed at the second input shaft 221 (the high gear side) together with the transmission of FIG. 7.

For the backward movement, the first one-way clutch 41" is released by releasing the first brake B1 disposed at the low gear side, and the second brake B2 restrains the rotation of the second input shaft 221". In this state, even when the first driving source 21 (the low gear side) is rotated, the force is not transmitted to the second driving source 22 (the high gear side), and thus it is not necessary to separately apply the current.

Further, in the above-mentioned embodiment, the sprag clutch was indicated as the one-way clutch. However, if the one-way clutch is not an electric one-way clutch, but a mechanical one-way clutch, a roller clutch or a ratchet clutch may be used, and various other mechanical one-way clutches may also be used.

Further, it was indicated that the transmission according to the present invention was installed on the electric bicycle or the scooter, but the present invention is not limited thereto. The present invention may also be used in a multi-wheeled vehicle or the like.

Furthermore, the motor or the engine was used as the driving source according to the present invention, but the present invention is not limited thereto. The driving source according to the present invention may include a pedaling motion of a person, for example, manpower. That is, both of the first and second driving sources may use the pedaling motion of the person, or only one of the first and second driving sources may use the pedaling motion of the person.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A transmission for changing a rotational speed of wheel, comprising:
   a first driving source configured to provide a rotational force and having a first input shaft;
   a second driving source configured to provide the rotational force and having a second input shaft;
   a planetary gear unit including a sun gear, a planetary gear and a ring gear, the sun gear being connected to the first input shaft, the ring gear being connected to the second input shaft, and the planetary gear being connected to an output shaft;
   a first one-way clutch disposed between the first driving source and the planetary gear unit to allow the first input shaft to be rotated in only a first direction while mechanically restraining a rotation thereof in an opposite direction to the first direction; and
   a second one-way clutch disposed between the second driving source and the planetary gear unit so as to allow the second input shaft to be rotated in only a second direction while mechanically restraining a rotation thereof in an opposite direction to the second direction,
   wherein the first direction and the second direction are set such that the output shaft of the planetary gear unit is rotated in the same direction, and
   wherein the first and second one-way clutches allow both the sun and ring gears to rotate in the same direction when the first and second input shafts rotate in the first and second directions respectively.

2. The transmission of claim 1, wherein the first one-way clutch comprises a first rotational body connected with the first input shaft, and a second rotational body, and the first rotational body is formed to be relatively rotated with respect to the second rotational body in the first direction.

3. The transmission of claim 1, wherein the first one-way clutch is one of a sprag clutch, a roller clutch and a ratchet clutch.

4. The transmission of claim 2, wherein the second rotational body is restrained from being rotated.

5. The transmission of claim 2, wherein the second rotational body is selectively rotated or restrained from being rotated by a first brake.

6. The transmission of claim 5, wherein the second input shaft is selectively rotated or restrained from being rotated by a second brake.

7. The transmission of claim 1, wherein the second one-way clutch comprises a third rotational body connected with the second input shaft, and a fourth rotational body, and the third rotational body is formed to be relatively rotated with respect to the fourth rotational body in the second direction.

8. The transmission of claim 1, wherein the second one-way clutch is one of a sprag clutch, a roller clutch and a ratchet clutch.

9. The transmission of claim 7, wherein the fourth rotational body is restrained from being rotated.

10. The transmission of claim 7, wherein the fourth rotational body is selectively rotated or restrained from being rotated by a first brake.

11. The transmission of claim 1, wherein the first driving source is connected with the sun gear, and the second driving source is connected with the ring gear.

12. The transmission of claim 1, wherein an output-side clutch configured to selectively connect and disconnect a rotational force from the first or second driving source is connected to the output shaft.

13. The transmission of claim 12, wherein the output-side clutch is an electromagnetic clutch operated by an electric signal.

14. The transmission of claim 1 which is installed one of an electric bicycle, a scooter and a vehicle.

15. The transmission of claim 2, wherein the first one-way clutch is one of a sprag clutch, a roller clutch and a ratchet clutch.

16. The transmission of claim 7, wherein the first one-way clutch is one of a sprag clutch, a roller clutch and a ratchet clutch.

17. The transmission of claim 1, wherein the first one-way clutch does not allow the sun gear to rotate when only the second input shaft rotates.

18. The transmission of claim 17, wherein only the ring and planetary gears rotate when only the second input shaft rotates.

19. The transmission of claim 1, wherein the second one-way clutch does not allow the ring gear to rotate when only the first input shaft rotates.

20. The transmission of claim 19, wherein only the sun and planetary gears rotate when only the first input shaft rotates.

* * * * *